United States Patent
Shihab et al.

(10) Patent No.: US 11,551,292 B2
(45) Date of Patent: Jan. 10, 2023

(54) SYSTEMS AND METHODS FOR VALIDATING REPEATING DATA

(71) Applicant: Mastercard International Incorporated, Purchase, NY (US)

(72) Inventors: Samy Shihab, Cottleville, MO (US); Kyle Williams, Wentzville, MO (US); David J. Senci, Troy, IL (US)

(73) Assignee: Mastercard International Incorporated, Purchase, NY (US)

( * ) Notice: Subject to any disclaimer, the term of this patent is extended or adjusted under 35 U.S.C. 154(b) by 185 days.

(21) Appl. No.: 16/838,921

(22) Filed: Apr. 2, 2020

(65) Prior Publication Data

US 2021/0312542 A1   Oct. 7, 2021

(51) Int. Cl.
*G06Q 20/42* (2012.01)
*G06Q 40/02* (2012.01)
*G06F 3/06* (2006.01)

(52) U.S. Cl.
CPC ........... *G06Q 40/02* (2013.01); *G06F 3/0619* (2013.01); *G06F 3/0659* (2013.01); *G06F 3/0673* (2013.01); *G06Q 20/42* (2013.01)

(58) Field of Classification Search
USPC .................................................. 705/35, 44
See application file for complete search history.

(56) References Cited

U.S. PATENT DOCUMENTS

| | | | |
|---|---|---|---|
| 9,384,232 B2 | 7/2016 | Pittelko | |
| 9,430,505 B2 | 8/2016 | Padmanabhan et al. | |
| 9,830,596 B2 | 11/2017 | Collison et al. | |
| 2013/0185191 A1* | 7/2013 | Ganor | G06Q 40/02 705/39 |
| 2016/0027008 A1 | 1/2016 | John | |
| 2016/0210307 A1 | 7/2016 | Pittelko | |
| 2016/0248589 A1 | 8/2016 | Potlapally et al. | |
| 2017/0148020 A1* | 5/2017 | Vienravee | G06Q 20/401 |
| 2017/0278104 A1 | 9/2017 | O'Connell et al. | |
| 2021/0158253 A1* | 5/2021 | Dolan | G06Q 20/102 |

* cited by examiner

*Primary Examiner* — William E Rankins
(74) *Attorney, Agent, or Firm* — Armstrong Teasdale LLP

(57) ABSTRACT

A computing system for validating repeating data is described. The computing system includes at least one computing device including at least one processor communicatively coupled to a database. The at least one processor is programmed to receive a first instance of data, the first instance of data including first repeating data elements, and store, in the database, the first repeating data elements. The at least one processor is also programmed to receive a second instance of data, the second instance of data including second repeating data elements, determine the second instance of data includes the second repeating data elements, and compare the second repeating data elements to the first repeating data elements. The at least one processor is further programmed to determine the second repeating data elements are inconsistent with the first repeating data elements and transmit a signal associated with the second repeating data elements.

20 Claims, 8 Drawing Sheets

SYSTEMS AND METHODS FOR VALIDATING REPEATING DATA

BACKGROUND

The field of the invention relates generally to validating repeating data, and more specifically, systems and methods for monitoring repeating data, such as installment payments, and triggering events that may cause alerts to be transmitted and/or declines to be initiated.

In today's world there are many forms of repeating data that need to be validated. Many users associated with repeating data are only given the choices of verifying the repeating data manually, or not verifying it at all. Repeating data may include, for example, repeated payments, such as for a gym membership, and installment payments for goods and/or services. It is a hassle for users to remember to check repeating data. If users do remember to check repeating data it is also inconvenient to manually check the repeating data and verify that the repeating data is correct. Thus, systems and methods are needed for validating repeating data and prompting a user when the repeating data is not valid or is otherwise inconsistent with what it should be.

Consumers today often have various payment options to pay merchants for goods and/or services. One such option is to set up installment payments, wherein a consumer pays a fixed amount at a fixed frequency for a fixed period of time in order to pay the merchant. The fixed period of time during which payments are made may last over several months, or even years. Over time, some customers, who are used to being billed for the installments, may stop monitoring the installment payments to ensure the correct amount is being charged at the proper frequency. This may lead to overbilling, double-billing, and/or billing after installment payments should have stopped.

Therefore, there is a need for systems and methods that can alert customers to inconsistent payment requests and/or block unauthorized installment payments, and more specifically, systems and methods for monitoring installment payments and/or installment payment requests and triggering events based on installment payment (IP) data.

BRIEF DESCRIPTION

In one aspect a computing system for validating repeating data is described. The computing system includes at least one computing device including at least one processor communicatively coupled to a database. The at least one processor is programmed to receive a first instance of data, the first instance of data including first repeating data elements, and store, in the database, the first repeating data elements. The at least one processor is also programmed to receive a second instance of data, the second instance of data including second repeating data elements, determine the second instance of data includes the second repeating data elements, and compare the second repeating data elements to the first repeating data elements. The at least one processor is further programmed to determine the second repeating data elements are inconsistent with the first repeating data elements and transmit a signal associated with the second repeating data elements.

In another aspect, a method for monitoring installment payments and triggering events based on installment payment (IP) data is provided. The method includes receiving, at a processor, a first transaction request, the first transaction request including first IP request data and determining, by the processor, that the first transaction request is associated with the first installment payment by determining that the first transaction request includes the first IP request data. The method also includes storing, in a database, the first IP request data as first IP data, receiving, at the processor, a second transaction request, the second transaction request including second IP request data, and determining, by the processor, that the second transaction request includes the second IP request data. The method further includes comparing, by the processor, the second IP request data to the first IP data, determining, by the processor, the second IP request data is inconsistent with the first IP data, and transmitting, from the processor, a signal associated with the second transaction request.

In yet another aspect, at least one non-transitory computer-readable storage media having computer-executable instructions embodied thereon is described. When the computer-executable instructions are executed by at least one processor, the computer-executable instructions cause the IP computing device to receive a first transaction request, the first transaction request including first IP request data and determine that the first transaction request is associated with the first installment payment by determining that the first transaction request includes the first IP request data. The computer-executable instructions also cause the IP computing device to store, in a database, the first IP request data as first IP data, receive a second transaction request, the second transaction request including second IP request data, and determine that the second transaction request includes the second IP request data. The computer-executable instructions further cause the IP computing device to compare the second IP request data to the first IP data, determine the second IP request data is inconsistent with the first IP data, and transmit a signal associated with the second transaction request.

BRIEF DESCRIPTION OF THE DRAWINGS

FIG. 1 is a schematic diagram illustrating an example installment payment (IP) computing system for monitoring installment payments and triggering events based on IP data.

FIG. 2 is an example data flow diagram illustrating the monitoring of installment payment (IP) data, implemented using the IP computing system shown in FIG. 1.

FIG. 3 is an example data flow diagram illustrating notifying a user of a merchant-requested inconsistent installment payment and blocking the associated installment payment request, implemented using the IP computing system shown in FIG. 1.

FIG. 4 is an example data flow diagram illustrating notifying a user of a merchant-requested consistent installment payment, implemented using the IP computing system shown in FIG. 1.

FIG. 5 illustrates an example configuration of a user computing device shown in FIG. 1, in accordance with one embodiment of the present disclosure.

FIG. 6 illustrates an example configuration of server components for monitoring installment payments using the IP computing system shown in FIG. 1.

FIG. 7 is a flow chart of an example process for monitoring installment payments and triggering events via the IP computing system shown in FIG. 1.

FIG. 8 is a diagram of components of one or more example computing devices that may be used in the IP computing system shown in FIG. 1.

DETAILED DESCRIPTION

Figure 1:
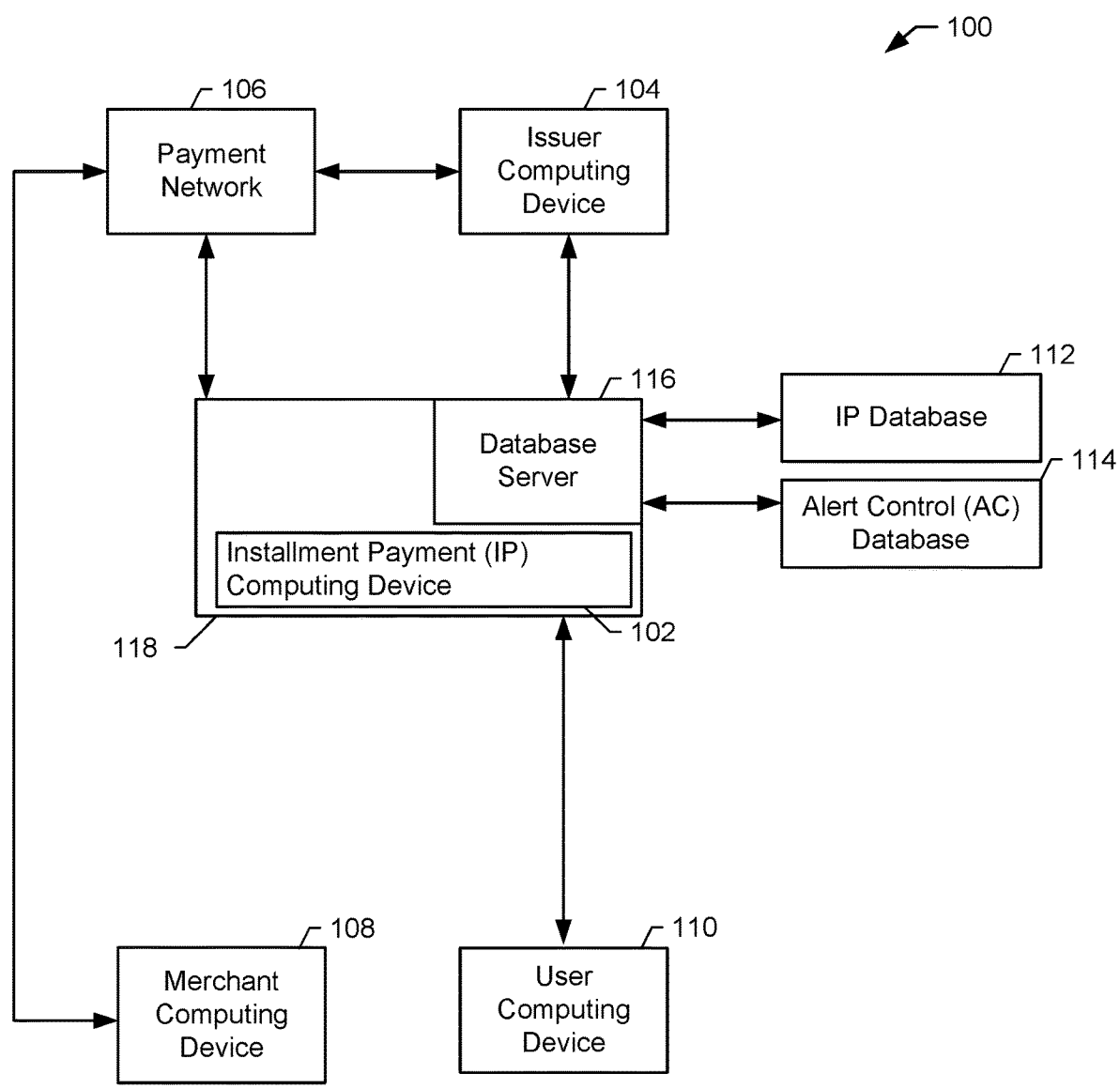
FIGS. 1-8 show example embodiments of the systems and methods described herein.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

The systems and methods described herein relate to validating repeating data, and more specifically to monitoring and validating periodically repeating data. Repeating data may include, for example, data that repeats on a periodic basis at a defined frequency. The frequency at which the repeating data is repeated may be defined at a first instance and detected by a computing system for validating repeating data. Other data elements of the repeating data may also be detected by the computing system at the first instance, such as the total period of time over which the data will repeat in addition to the frequency at which the data will repeat. Further, the computing system may be configured to detect future instances of the repeating data, and compare those future instances of the repeating data to previous instances of the repeating data, including the first instance of repeating data. Thus, the computing system for validating repeating data may be configured to determine when instances of repeating data are inconsistent with previous instances of the repeating data. In other words, the computing system may be configured to detect when a current instance of repeating data is inconsistent with previous instances of the repeating data by determining, for example, the current instance of repeating data is inconsistent with the defined frequency at which data will repeat and/or is inconsistent with the defined total period of time over which the data will repeat.

For example, a computing system for validating repeating data, including at least one computing device with at least one processor communicatively coupled to a database may be provided. The at least one processor may be programmed to receive a first instance of data, the first instance of data including first repeating data elements including a length of time over which instances of repeating data will be received, a frequency at which instances of repeating data will be received, and other information that is expected to be received in future instances of data. The first instance of data may be used to define a repeating data plan. The repeating data plan may then be used by the at least one processor when the at least one processor receives future instances of data, such as a second instance of data or third instance of data. The at least one processor may also be programmed to determine the first instance of data is associated with a first repeating data plan by determining that the first instance of data includes the first repeating data elements, store, in a database, the first repeating data elements, receive a second instance of data, the second instance of data including second repeating data elements, and determine the second instance of data includes the second repeating data elements and is associated with a first repeating data plan. The at least one processor may further be programmed to compare the second repeating data elements to the first repeating data elements, determine the second repeating data elements are inconsistent with the first repeating data elements, and transmit a signal associated with the second repeating data elements. The data elements compared by the at least one processor may include, for example, the length of time over which instances of repeating data will be received with a date of the second instance of data and/or the frequency at which instances of repeating data will be received with the date of the first instance of data and the date of the second instance of data.

In some embodiments, the at least one processor may also be configured to determine a user preference before transmitting a signal associated with the second repeating data elements. In these embodiments, the user preference may be, for example, an alert transmitted to a user computing device or to transmit a signal rejecting the second instance of data. In embodiments where the user preference is for an alert to be transmitted to a user computing device, the processor may further be configured to receive a signal from the user computing device to reject the second instance of data.

In other embodiments, the processor may be further configured to, upon receipt of the second instance of repeating data, including second repeating data elements, determine if the second repeating data elements have already been stored in the database and yet further configured to compare instances of repeating data to other associated instances of repeating data stored in the database.

The computing system for validating repeating data may be, for example, an installment payment (IP) computing system configured to monitor and validate installment payment data, as is described below.

An IP computing system configured to monitor installment payments and trigger events based on installment payment (IP) request data is described herein. In the example embodiment, the IP computing system is configured to provide an IP service as described further herein. The IP computing system includes at least one IP computing device, at least one issuer computing device, at least one merchant computing device, at least one installment payment (IP) database, at least one alert control (AC) database, and/or at least one user computing device.

The IP service enables a user to easily track installment payments over a period of time. For example, a user may purchase a good or service from a merchant, wherein payment for the good and/or service is agreed to be split and spread out over a period of time as installment payments (e.g., for a $600 purchase, paying $100 (or some higher amount to account for interest payments) a month over 6 months). After the user completes a first installment payment, the IP system generates, from transaction data associated with the completed installment payment, an installment definition that identifies an installment plan established between the merchant and the user (e.g., an amount, frequency, and length of installment payments, such as $100, once a month, for 6 months). The IP system tracks subsequent or future installment payments and/or future installment payment requests to determine whether the subsequent installment payments/requests are in compliance with the defined installment plan. Upon determining an installment payment requested by a merchant is not in compliance with the established installment plan, the IP computing device is configured to block the requested payment and/or notify the user of the inconsistent request and/or payment, depending on a user preference. Accordingly, a user can take comfort in knowing the IP computing system is monitoring their installment plan, including an amount charged for installment payments, the length of time over which installment payments will be made, and a frequency with which installment payments will be made, and can identify aberrant installment payment requests before the user makes an unnecessary or incorrect payment.

The IP computing device may be associated with or integral to a payment network (e.g., an interchange network for processing the installment payments), such that the IP computing device may access incoming IP requests and outgoing completed installation payments. Alternatively, the IP computing device may not be part of the payment network but is communicatively coupled to one or more payment processors to receive incoming IP requests and outgoing completed installation payments therefrom. In still other embodiments, the IP computing device is associated with the issuer computing device, and the IP service is available through the issuer. In such embodiments, the IP computing device receives incoming IP requests and outgoing completed installation payments from the issuer computing device.

Further, the IP computing device may be configured to determine when an IP request is included in a larger request, such as a transaction request, by processing the data associated with the transaction request. For example, the IP computing device may determine an IP request is included in a transaction request upon determining certain data elements exist in the transaction request that correspond to an IP request. In this example, the transaction request may be in the form of an authorization request and/or response message. The authorization response and/or response message may be formatted as a network message, such as an ISO 8583 network message, such that data elements may be within or appended to the network message. The data elements corresponding to an IP request may include data elements indicating, for example, the number of installment payments to be made, the frequency at which installment payments will be made, the total length of time over which installment payments will be made, and the amount requested by a merchant for the installment payments.

In the example embodiment, the IP database and the AC database are communicatively coupled to the IP computing device. The IP database and the AC database are separate from each other, and, in at least some embodiments, the IP and AC databases are in communication with the IP computing device over different communication networks in a distributed architecture. In some alternative embodiments, the IP database and the AC database may be the same database, but IP data and alert preferences (described further herein) may be stored separately.

The AC database is configured to store data associated with alert preferences of users. User alert preferences are selected or set by users, and identify whether and how each user wishes to receive alerts regarding their installment plan and payments thereof. A user may be, for example, a consumer, payor, and/or cardholder associated with one or more installment payments. A user alert preference may be, for example, that the user wishes to receive an alert when any inconsistent IP request is received (or completed), and/or that the user wants any inconsistent IP request to be declined before a payment associated therewith is completed. The data stored by the AC database includes, but is not limited to, an account identifier (e.g., a payment account number (PAN) such as a virtual PAN or tokenized PAN), user contact information, and a user alert preference, indicating a user-preferred response by the IP computing device when the IP computing device determines a merchant-requested installment payment is inconsistent with an installment payment plan.

The IP database is configured to store data associated with installment payments of users. The IP computing device may be configured to determine data to be stored in the IP database, such as certain data elements within or appended to an authorization request and/or response message formatted as a network message, as is described above. The data stored in the IP database includes, but is not limited to, an account identifier (e.g., a virtual PAN or tokenized PAN) associated with the payment account used to make installment payments, an amount charged for installment payments, a length of time for installment payments (e.g., the period of time over which installment payments will be made), and a frequency of installment payments. In the example embodiment, the user completes a first transaction with the merchant after receiving a first transaction request, the first transaction request including first IP request data indicating the merchant's request for the first installment payment in the installment plan. The first transaction request is generated by the merchant, at a merchant computing device associated therewith (e.g., a point-of-sale (POS) device). The user completes the first transaction, thereby completing the first installment payment. The completed payment (made by the user) is processed by at least one payment network and at least one issuer computing device. The first transaction request data may include any data related to the first transaction request and/or the completed payment associated therewith, such as, for example, a location of the transaction, a time of the transaction, an amount charged for the transaction, and first installment payment (IP) request data.

The IP computing device is configured to identify first IP request data in the first transaction request, and store the first IP request data as first IP data in the IP database. The first IP data may include, for example, an account identifier, an amount charged for the first installment payment, the length of time for installment payments, and the frequency of installment payments. In at least some embodiments, this first IP data may be included in an authorization request and/or response message (e.g., as data elements within or appended to such a message which may be formatted as a network message, such as an ISO 8583 network message).

At a later time, the merchant computing device will request a second transaction, associated with a second installment payment, by transmitting a second transaction request (e.g., an authorization request) including second IP request data. The merchant computing device will transmit the second transaction request to the payment network, which is in communication with the IP computing device. The IP computing device will then perform a lookup in the IP database for first IP data (or other associated IP data). The IP computing device will then compare the second IP request data, from the received second transaction request, to the stored first IP data. The comparison may include comparing, for example, an amount charged for the first installment payment with an amount charged for the second installment payment request, a length of time for installment payments with a date of the second installment payment request (to make sure the date is within a time frame agreed upon by the user and the merchant), and a frequency of installment payments with the date of the first installment payment and the date of the second installment payment request (to ensure the payments are not being made too far apart or too close together). In some embodiments, a length of time for installment payments may be a total length of time of installment payments, defined by an end date, or a total number of expected installment payments at the frequency of installment payments.

If the comparison shows inconsistencies between the first IP data and the second IP request data, the IP computing device is configured to transmit a signal associated with the second transaction request. Before transmitting the signal associated with the second transaction request, the IP computing device determines a user preference by performing a lookup in the AC database for any user preference (e.g., using the account identifier or other data elements common to installment payments for a same installment plan). In some embodiments, the user preference is to decline the second transaction request. In these embodiments, the IP computing device is configured to transmit the signal as a decline instruction message to the issuer computing device associated with the user's payment account, instructing the issuer to decline the second transaction request. Alternatively, the IP computing device may transmit the signal to the merchant computing device as a decline message, via the issuer computing device and the payment network, to decline the second transaction request. In further embodiments, the user preference is to receive an alert associated with the second transaction request. In these embodiments, the IP computing device is configured to transmit the signal to the user computing device associated with the user, notifying the user of the second transaction request that is inconsistent with the first installment payment. In these embodiments, the user may be presented with, at the user computing device, an option to then block the second transaction request (e.g., cause the second installment payment request to be declined). Upon a user request to block the second transaction request, the IP computing device is configured to transmit a signal to the merchant computing device, via an issuer computing device and a payment network, to block the second transaction.

In further embodiments, the IP computing device may be configured to compare IP request data associated with one user to stored IP data associated with a different user. For example, the IP database may not have any stored IP data for the IP computing device to compare with the IP request data (e.g. IP computing device receives a third installment payment request, but first and second IP data are not stored in the IP database). In these examples, the IP computing device may be configured to compare the IP request data to similar IP data associated with different users (e.g., from the same merchant, for the same product, etc.) stored in the IP database.

In these further embodiments, a processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data, such as IP data stored in the IP database, in order to facilitate making predictions for subsequent data, such as IP request data. Models may be created based upon example inputs in order to make valid and reliable predictions for novel inputs.

Additionally or alternatively, the machine learning programs may be trained by inputting sample (e.g., training) data sets or certain data into the programs, such as IP data stored in the IP database and/or projected future IP request data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning. In the exemplary embodiment, IP data feeds back into the machine learning programs in real-time to update its set of parameters.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In the exemplary embodiment, machine learning techniques are used to predict IP request data, and to output the predictions that are stored in the IP database.

In the exemplary embodiment, a processing element may be trained by providing it with a large sample of IP data (e.g., regarding installment payments completed by different users and/or installment payment requests from different merchants). Such information may include, for example, information associated with amounts (e.g., dollar amounts), frequency, and length of time for completing installment payments.

Based upon these analyses, the processing element may learn how to identify characteristics and patterns that may then be applied to analyzing IP data and/or IP request data. For example, the processing element may learn to predict consistent and/or inconsistent IP requests from certain merchants. Similarly, the processing element may also learn to identify which data elements are more likely than others to be incorrect and/or inconsistent in an IP request (e.g., an amount charged in an IP request).

In further embodiments, the IP computing device may be configured to transmit the signal associated with the second transaction request only if the comparison shows a discrepancy between the received IP request data and the stored installment payment data that is larger than a certain threshold. Relatively low discrepancies or differences between stored IP data and received IP request data may occur due to factors such as interest, currency conversion differences, and the like. For example, if the second IP request data differs from the first IP data by less than a dollar, the IP computing device may not transmit any signal associated with the second transaction request.

As another example, if a transaction request, including an installment payment request, is made a day earlier or a day later than expected, the IP computing device may not transmit any signal to the user, because the difference of a day may not be a big enough difference to warrant a notification (e.g., such a discrepancy may be due to the difference in the number of days in consecutive months and may not represent an actual error). If, however, a transaction request is made a week early, such a discrepancy may exceed a predefined threshold and therefore may cause the IP computing device to transmit the signal associated with the transaction request.

In some embodiments, different thresholds may be set by the user (e.g., as part of their user preferences). Thresholds may also be predetermined by an issuer or payment network, for example. In these embodiments, the user may be able to adjust the predetermined thresholds to better accommodate their preferences.

The IP computing device may also be configured to transmit a notification to the user computing device even when the second IP request data does comply with the stored first IP data. Thus, the user would be notified that the IP system is performing the IP service by monitoring their installment payments, even though the installment payments are being requested and completed correctly (e.g., consistent with the installment plan).

In some embodiments, a user may request to receive an update on their installment payments (e.g., their progress towards completing the installment plan) from the IP computing device. In these embodiments, the IP computing device is configured to transmit installment payment progress data to the user computing device, which provides an update on the user's progress towards completing the installment plan. For example, the installment plan progress data many include a number of installment payments completed, a remainder of time for the installment plan, a number of expected subsequent installment payments yet to be made, and the like. In one example, the installment payment progress data may show that installment payments are $100.00 each, installment payments will be made for three more months, installment payments are made once per month, and currently three installment payments have been made (e.g., out of six total scheduled installment payments). Thus, the user will know they have three installment payments left to be made, at a frequency of once per month for the next three months, of $100.00 each.

In the example embodiment, the IP computing device is configured to only store IP request data in the IP database as IP data if the transaction associated with the IP request data is completed. For example, if a transaction request, including an IP request, is declined and/or blocked, the IP device may not store the IP request data in the IP database as IP data. This ensures future comparisons of IP request data to IP data will only include comparisons of IP request data to accurate IP data.

At least some of the technical problems addressed by this system include: (a) users/customers not diligently monitoring installment payments manually as time passes from an initial installment payment; (b) user desire to have installment payments monitored automatically in order to save time; (c) incorrect installment payments being charged to customers, and not being caught in time to have the requested installment payment declined; and (d) user desire to check a current status and history of installment payments.

A technical effect of the systems and processes described herein is achieved by performing at least one of: (a) receiving, at a processor, a first transaction request, the first transaction request including first IP request data; (b) determining, by the processor, that the first transaction request is associated with the first installment payment by determining that the first transaction request includes the first IP request data; (c) storing, in a database, the first IP request data as first IP data; (d) receiving, at the processor, a second transaction request, the second transaction request including second IP request data; (e) determining, by the processor, that the second transaction request includes the second IP request data; (f) comparing, by the processor, the second IP request data to the first IP data; (g) determining, by the processor, the second IP request data is inconsistent with the first IP data; and (h) transmitting, from the processor, a signal associated with the second transaction request.

The technical effects and advantages achieved by this system may include at least one of: (a) storing installment payment information such as the amount, length or duration, and frequency of installment payments, (b) automatically monitoring installment payments to ensure the correct amount is being charged (e.g., preventing over-charging), (c) automatically monitoring installment payments to ensure the payments are being charged at the correct frequency (e.g., preventing double-billing) (d) automatically monitoring installment payments to ensure no payments are being billed beyond the correct duration of an installment plan, (e) providing users comfort in knowing their installment payments are being charged properly, and (f) saving users time by them not having to check each installment payment manually.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example installment payment (IP) computing system 100 for monitoring installment payments and triggering events based on IP data. IP computing system 100 includes at least one IP computing device 102 in communication with at least one issuer computing device 104 (e.g., via a payment network 106), at least one merchant computing device 108 (e.g., via payment network 106), and at least one user computing device 110 (e.g., via the Internet). IP computing device 102 is further in communication with at least one IP database 112 and at least one alert control (AC) database 114. Database server 116 may be in communication with at least one database, such as IP database 112 and/or alert control (AC) database 114, that may store and/or process data, such as IP request data, and/or any other data described herein. IP computing device 102 may include a database server 116 that facilitates communication between IP computing device 102 IP database 112 and/or AC database 114. In one embodiment, IP database 112 and/or AC database 114 may be stored on server 118 and may be accessed by logging on to IP computing device 102 through user computing device 110. In an alternative embodiment, IP database 112 and AC database 114 are stored remotely from server 118 and may be non-centralized. In some embodiments IP database 112 and AC database 114 may be included in the same database.

In the example embodiment, merchant computing device 108 is a computing device of a merchant at which purchases/installment plans are made. Merchant computing device 108 is configured to generate authorization requests associated with transactions, including installment payment requests.

In the example embodiment user computing device 110 (e.g., a smartphone, laptop, tablet, etc.) is configured to receive user inputs from a user thereof regarding requested installment payments. User computing device 110 is further configured to generate and transmit, to IP computing device 102, a signal indicating a user request to block a requested transaction.

In the example embodiment issuer computing device 104 is associated with an issuer of a payment account used to set up the installment plan and/or make the requested installment payments that are not blocked.

In the example embodiment payment network 106 is an interchange network wherein when using the interchange network, computers of a merchant bank or a merchant processor will communicate with computers of an issuer bank to determine whether a cardholder's account is in good standing and whether the purchase/transaction is covered by a cardholder's available credit line.

In the example embodiment, a user may make a purchase with a merchant using a payment account, wherein a purchase price associated with the purchase will be paid over a series of installment payments, each installment payment made in response to a respective installment payment request from the merchant according to an installment plan established between the merchant and the user at the time of purchase.

Figure 2:
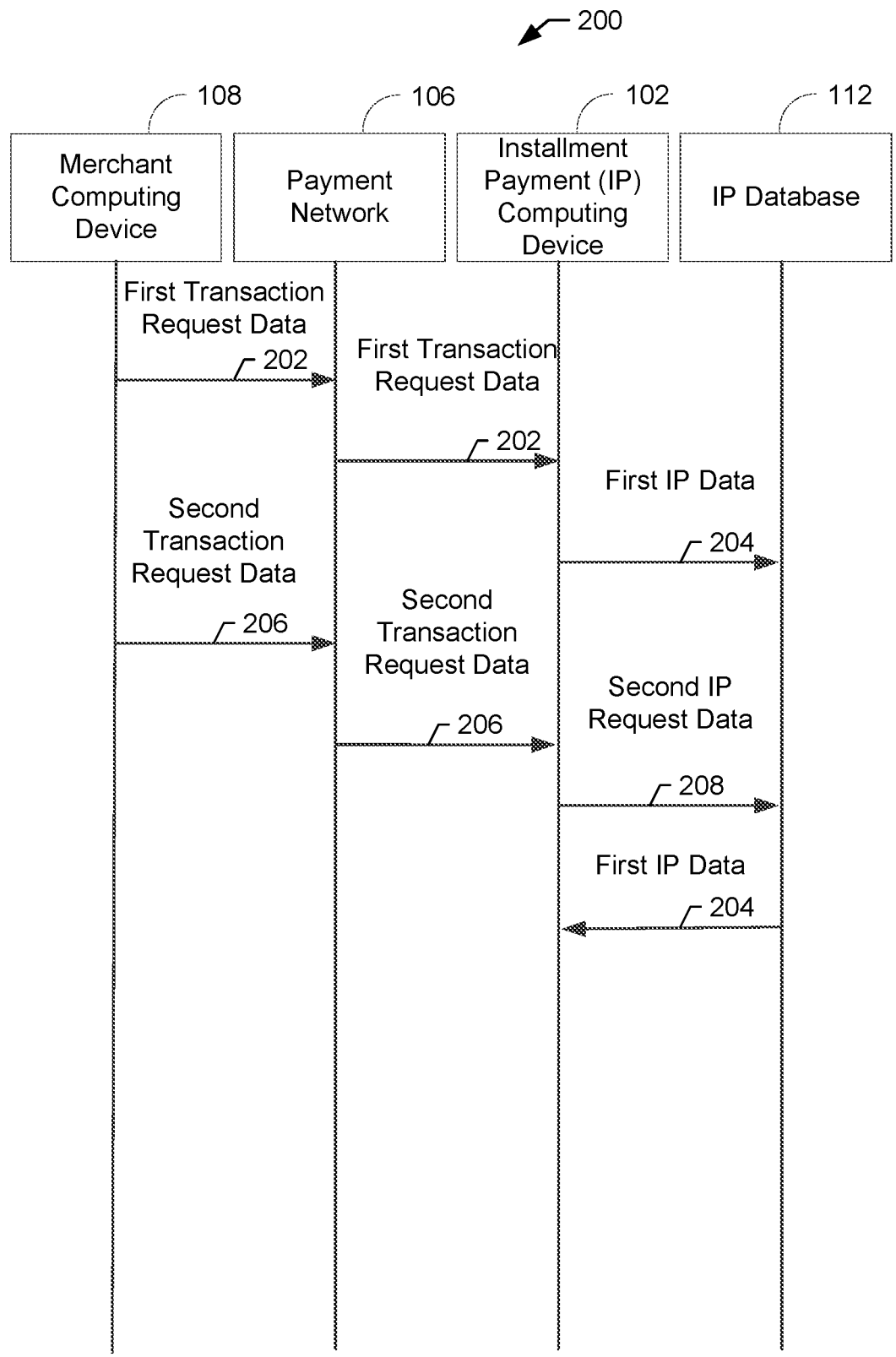

In particular, turning to FIG. 2, merchant computing device 108 is configured to transmit first transaction request data 202 including first installment payment (IP) request data to payment network 106. First transaction request data 202 includes an authorization request message (e.g., an ISO 8582 network message) and includes a plurality of data elements such as an account identifier, an amount charged for the first installment payment, the length of time for installment payments, and/or the frequency of installment payments. First transaction request data 202 is processed by payment network 106. IP computing device 102, which may be in communication with and/or integral to payment network 106, also receives first transaction request data 202 including first IP request data. IP computing device 102 stores first IP request data, as first IP data 204, in IP database 112, thus defining an installment plan established between the user and the merchant.

At a later period of time, as defined by the installment plan, merchant computing device 108 will transmit second transaction request data 206, including second IP request data, to IP computing device 102 via payment network 106. Upon receipt of second transaction request data 206, IP computing device 102 determines second transaction request data 206 includes second IP request data 208 defining a second IP request. IP computing device 102, using second IP request data 208, then requests and receives IP data associated with the second IP request data 208 from IP database 112 (e.g., by performing a lookup operation using an account identifier from second transaction request data 206, or another data element common to installation payments in a same installment plan). IP computing device 102 then receives first IP data 204 from IP database 112. In other embodiments, for example, if fourth IP request data is received at IP computing device 102 from payment network 106, IP computing device 102 will request and receive first IP data, second IP data, and third IP data from IP database 112. Accordingly, IP computing device 102 would then compare the fourth IP request data to the received first IP data, second IP data, and third IP data.

After receiving first IP data 204 from IP database 112, IP computing device 102 is configured to compare first IP data 204 to second IP request data 208. The comparison may include, for example, comparing an amount charged for the first installment payment with an amount charged for the second installment payment, a length of time for installment payments with a date of the second installment payment (to make sure the date is within a time frame agreed upon by the user and the merchant), and a frequency of installment payments with the date of the first installment payment and the date of the second installment payment (to ensure the payments are not being made too far apart or too close together).

If the comparison shows inconsistencies between first IP data 204 and second installment payment request data 208, IP computing device 102 is configured to transmit a signal associated with the second transaction request. Before transmitting the signal associated with the second transaction request, IP computing device 102 determines a user preference by performing a lookup in AC database 114 for any user preference (e.g. using the account identifier or other data elements common to installment payments for a same installment plan). In some embodiments, the user preference is to decline the second transaction request. In these embodiments, IP computing device 102 is configured to transmit the signal as a decline instruction message to issuer computing device 104 associated with the user's payment account, instructing the issuer to decline the second IP request. Alternatively, IP computing device 102 may transmit to merchant computing device 108 a decline message, via issuer computing device 104 and payment network 106, to decline the second transaction request.

Figure 3:
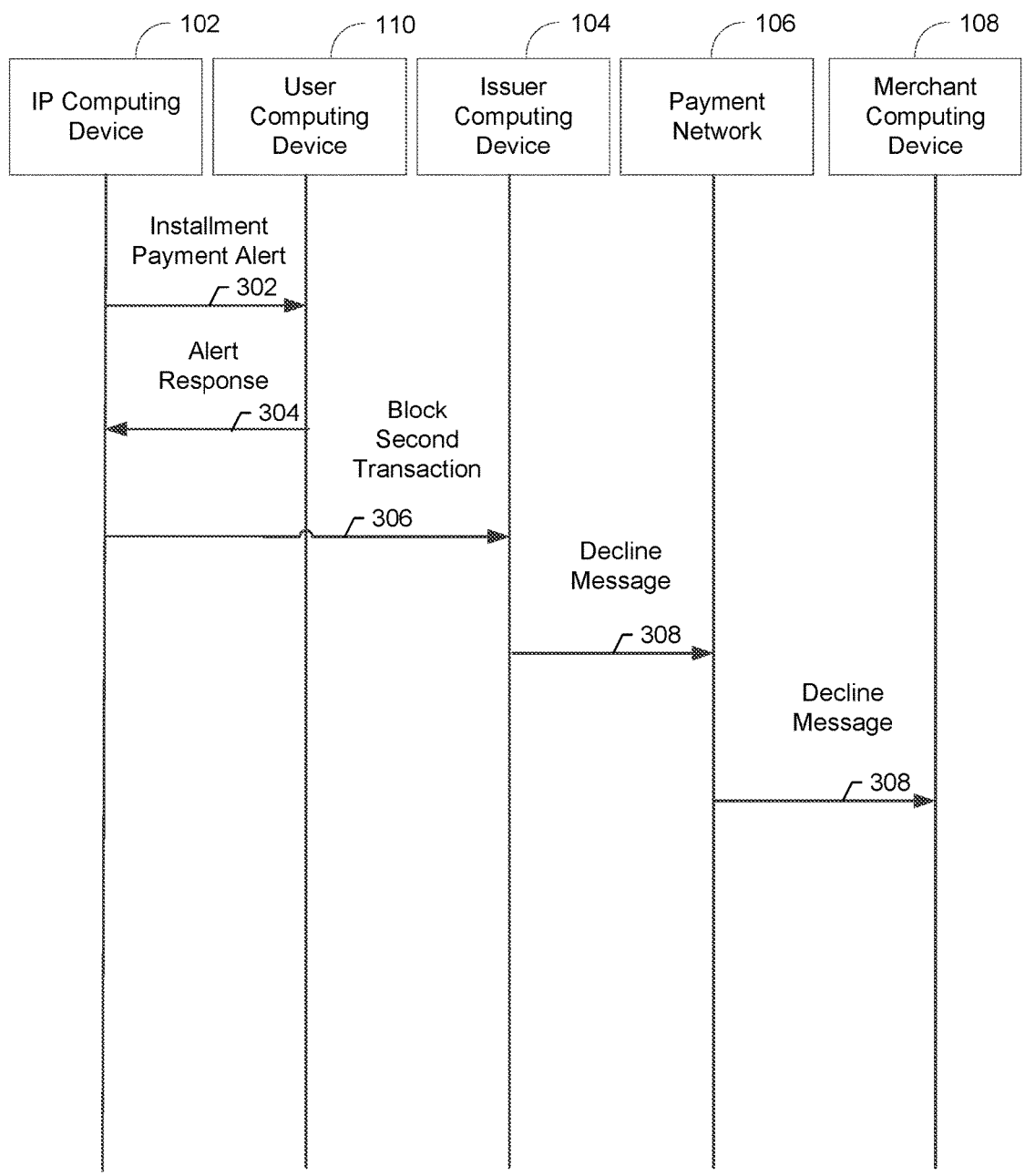

In further embodiments, such as in FIG. 3, the user preference is to receive an alert associated with the second transaction request. In these embodiments, IP computing device 102 is configured to transmit an installment payment alert signal 302 to user computing device 110 associated with the user, notifying the user of the second installment payment request that is inconsistent with the first installment payment. In these embodiments, the user may be presented with, at user computing device 110, an option to then block the second transaction request (e.g., cause the second installment payment request to be declined). Upon a user request to block the second transaction, such as alert response 304, IP computing device 102 is configured to transmit a signal to block the second transaction 306 to issuer computing device 104. Issuer computing device 104 then generates a decline message 308 that is transmitted to merchant computing device 108 via payment network 106.

In further embodiments, IP computing device 102 may be configured to transmit the signal associated with the second transaction request only if the comparison shows a discrepancy between the received IP request data and the stored installment payment data that is larger than a certain threshold. Relatively low discrepancies or differences between stored IP data and received IP request data may occur due to factors such as interest, currency conversion differences, and the like. For example, if the second IP request data differs from the first IP data by less than a dollar, IP computing device 102 may not transmit any signal associated with the second transaction request.

As another example, if a transaction request, including an IP request, is made a day earlier or a day later than expected, IP computing device 102 may not transmit any signal to user computing device 110, because the difference of a day may not be a big enough difference to warrant a notification (e.g., such a discrepancy may be due to the difference in the number of days in consecutive months and may not represent an actual error). If, however, a transaction request is made a week early, such a discrepancy may exceed a predefined threshold and therefore may cause IP computing device 102 to transmit the signal associated with the requested transaction.

In some embodiments, different thresholds may be set by the user (e.g., as part of their user preferences). Thresholds may also be predetermined by an issuer or payment network, for example. In these embodiments, the user may be able to adjust the predetermined thresholds to better accommodate their preferences.

Figure 4:
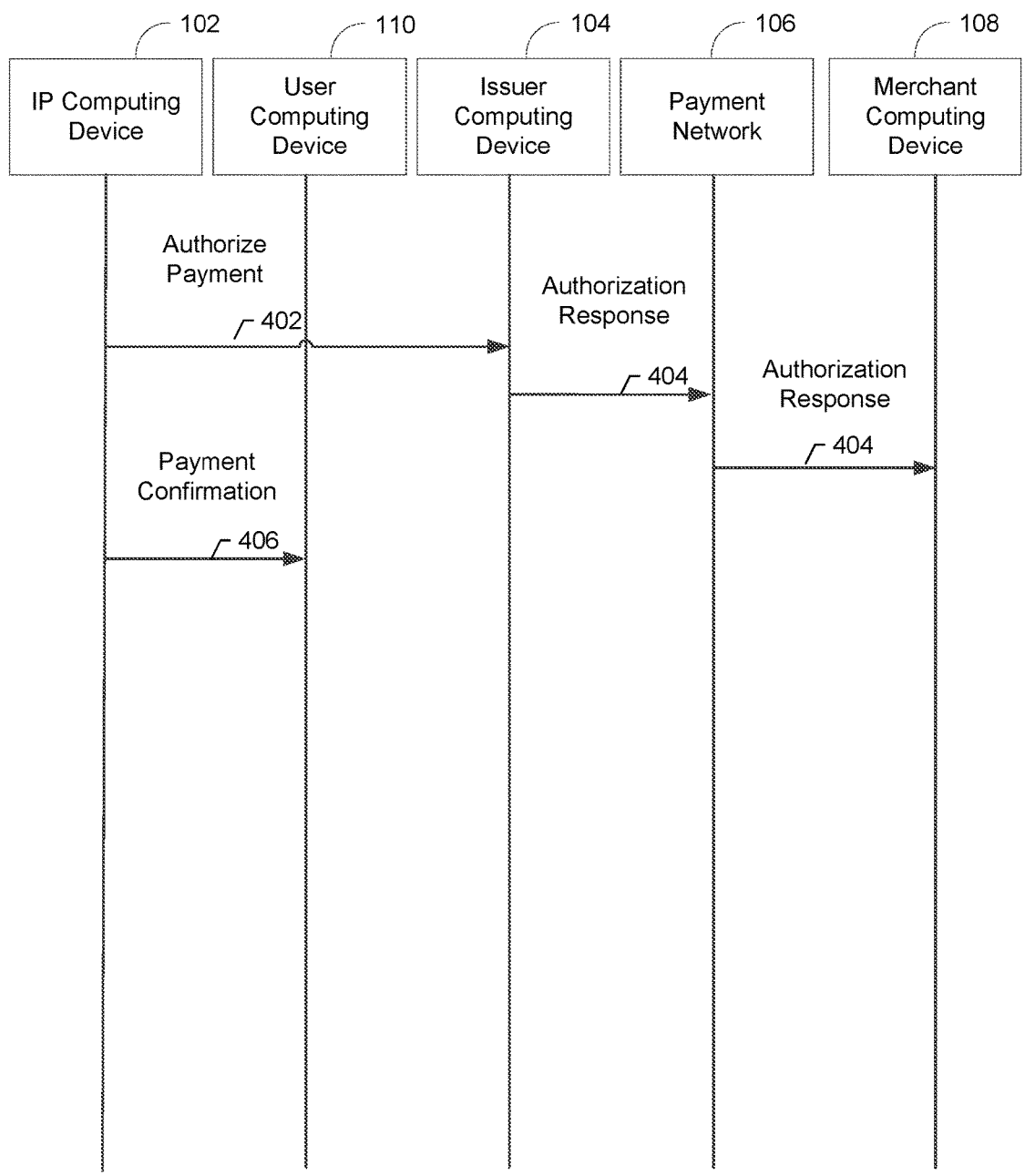

In yet further embodiments IP computing device 102 is configured to transmit a signal even when no discrepancies are found during the comparison of installment payment data, as is shown in FIG. 4. In the example embodiment, IP computing device 102, upon comparing first IP data with second IP request data, determines there are no discrepancies between first IP data and second IP request data and thus, the second IP request is correct. IP computing device 102 then generates a signal 402 including instructions to authorize the second transaction request. The authorization signal 402 is then transmitted from IP computing device 102 to issuer computing device 124, which causes issuer computing device 124 to authorize the second transaction request (e.g., by transmitting an authorization response message including an authorization or acceptance of the second transaction request using payment network 106). Upon authorizing the request, issuer computing device 124 transmits authorization response 404 to payment network 106. Payment network 106 then transmits the authorization response message 404 to merchant computing device 108, thereby completing the second transaction, including the second installment payment. It should be readily understood that, in some embodiments, IP computing device 102 may not actively intervene with instructions for issuer computing device 124 where the installation payment request is consistent with the installment plan, such that the installation payment request proceeds as a regular authorization request to issuer computing device 124 for authorization.

In the example embodiment, IP computing device 102 is configured to generate and transmit payment confirmation data 406 to user computing device 110, thereby notifying the user that an installment payment was made in response to a correct installation payment request. Payment confirmation data 406 may include, for example, an amount charged for the second installment payment, a date the second installment payment was made, and a sequence number of the installment payment, indicating that this was the second installment payment made for the particular series of installment payments established in the installment plan.

In some embodiments, a user may request to receive an update on their installment payments (e.g., their progress towards completing the installment plan) from IP computing device 102. In these embodiments, IP computing device 102 is configured to transmit installment payment progress data to the user computing device, which provides an update on the user's progress towards completing the installment plan. For example, the installment plan progress data many include a number of installment payments completed, a remainder of time for the installment plan, a number of expected subsequent installment payments yet to be made, and the like. In one example, the installment payment progress data may show that installment payments are $100.00 each, installment payments will be made for three more months, installment payments are made once per month, and currently three installment payments have been made (e.g., out of six total scheduled installment payments). Thus, the user will know they have three installment payments left to be made, at a frequency of once per month for the next three months, of $100.00 each.

Figure 5:
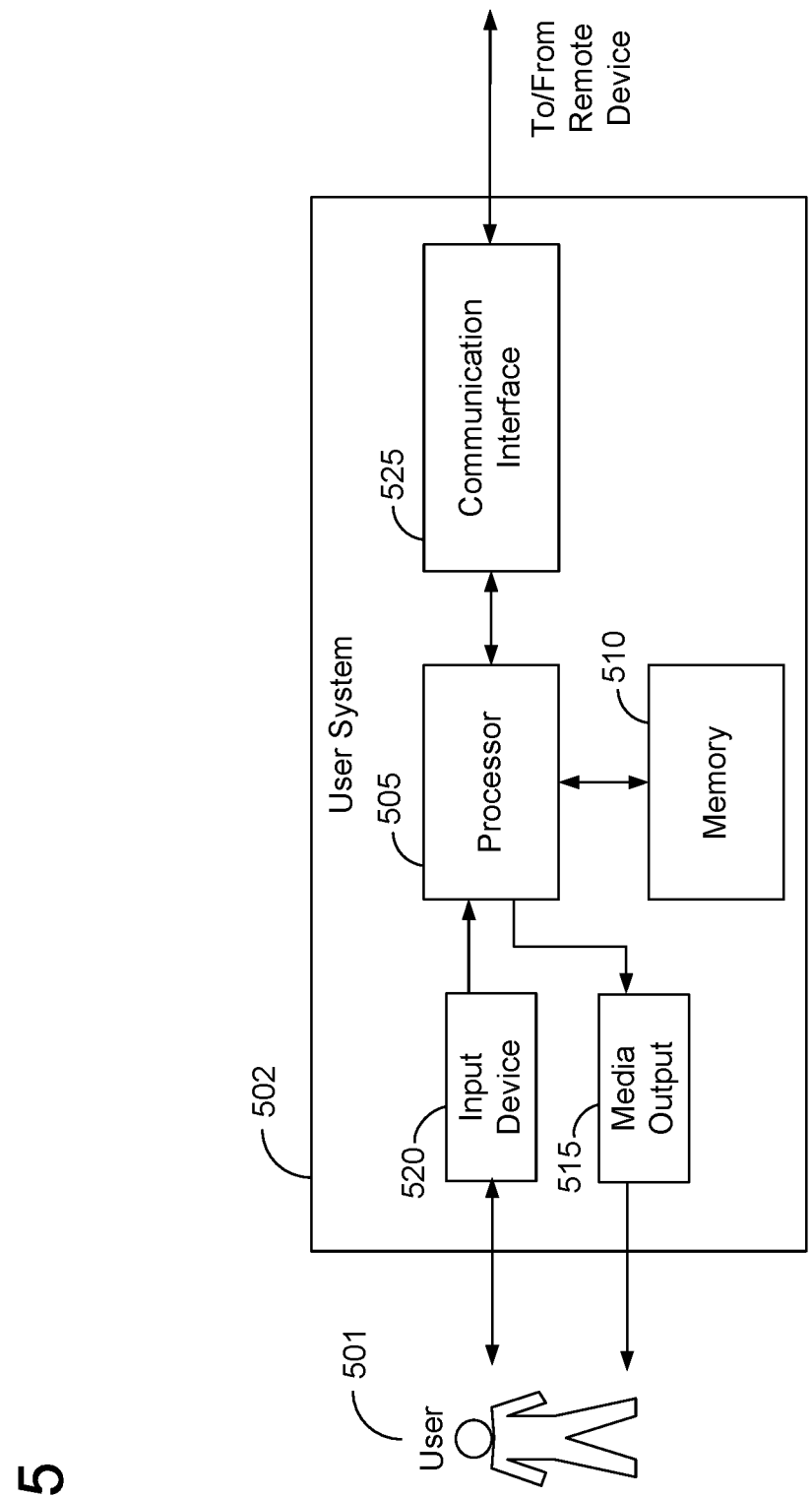

FIG. 5 illustrates an example configuration of a user system 502 operated by a user 501. In the example embodiment, user system 502 is similar to user computing device 110 and/or merchant computing device 108 (both shown in FIG. 1), and may be used by user 501 to interact with IP computing device 102 (also shown in FIG. 1). More specifically, user system 502 may be used to access an IP service provided by IP computing device 102, to monitor installment payments and/or installment payment requests. In the example embodiment, user system 502 includes a processor 505 for executing instructions. In some embodiments, executable instructions are stored in a memory area 510. Processor 505 may include one or more processing units, for example, a multi-core configuration. Memory area 510 is any device allowing information such as executable instructions and/or written works to be stored and retrieved. Memory area 510 may include one or more computer readable media.

User system 502 also includes at least one media output component 515 for presenting information to user 501. Media output component 515 is any component capable of conveying information to user 501. In some embodiments, media output component 515 includes an output adapter such as a video adapter and/or an audio adapter. An output adapter is operatively coupled to processor 505 and operatively couplable to an output device such as a display device, a liquid crystal display (LCD), organic light emitting diode (OLED) display, or "electronic ink" display, or an audio output device, a speaker or headphones.

In some embodiments, user system 502 includes an input device 520 for receiving input from user 501. Input device 520 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 515 and input device 520. User system 502 may also include a communication interface 525, which is communicatively couplable to a remote device, such as IP computing device 102. Communication interface 525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 510 are, for example, computer readable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from IP computing system 100. A client application allows user 501 to interact with a server application from IP computing system 100, such as the IP service.

Figure 6:
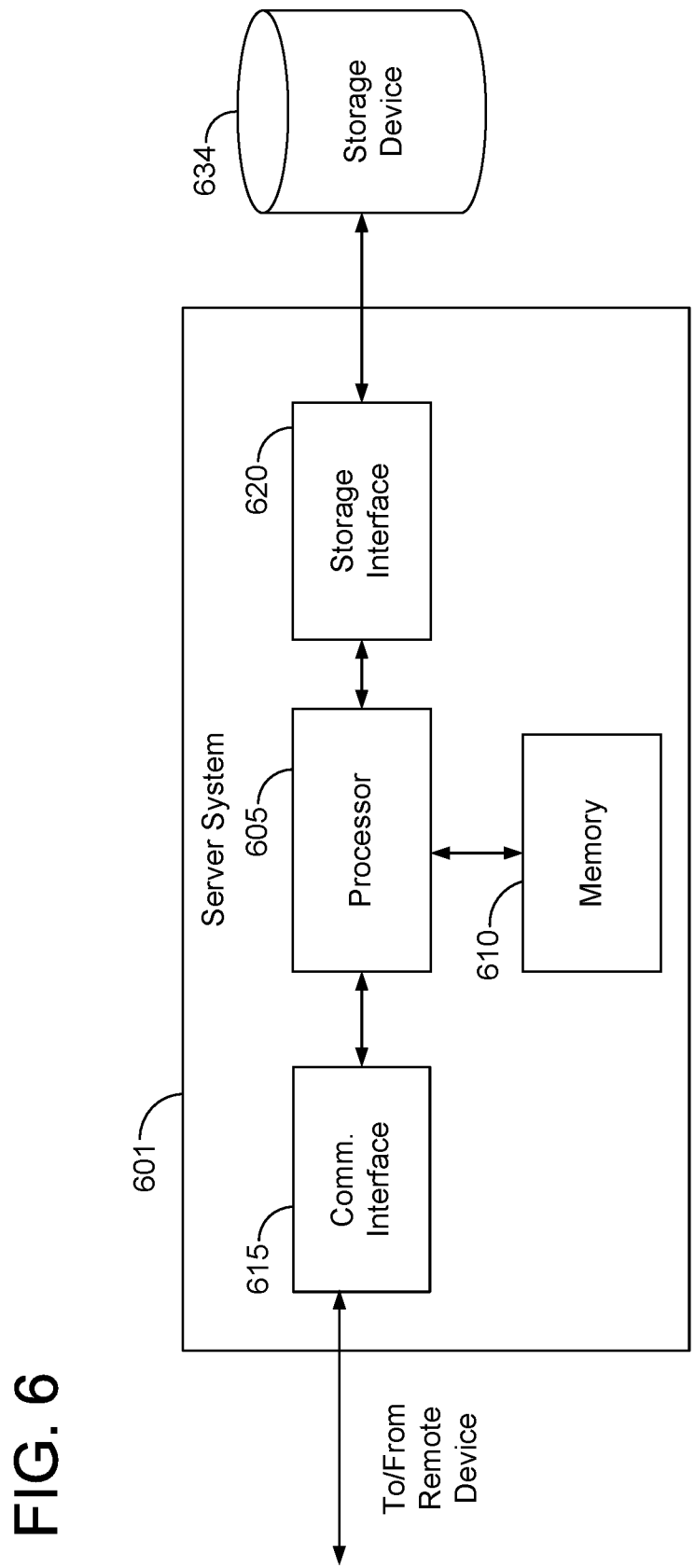

FIG. 6 illustrates an example configuration of a server system 601. Server system 601 may include, but is not limited to, IP computing device 102 (shown in FIG. 1). Server system 601 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on server system 601, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 605 is operatively coupled to a communication interface 615 such that server system 601 is capable of communicating with a remote device such as user system 502 (shown in FIG. 5) or another server system 601. For example, communication interface 615 may receive requests from user computing device 110 via the Internet, as illustrated in FIG. 1.

Processor 605 may also be operatively coupled to a storage device 634. Storage device 634 is any computer-operated hardware suitable for storing and/or retrieving data. In some embodiments, storage device 634 is integrated in server system 601. For example, server system 601 may include one or more hard disk drives as storage device 634. In other embodiments, storage device 634 is external to server system 601 and may be accessed by a plurality of server systems 601. For example, storage device 634 may include multiple storage units such as hard disks or solid state disks in a redundant array of inexpensive disks (RAID) configuration. Storage device 634 may include a storage area network (SAN) and/or a network attached storage (NAS) system.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Memory area 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
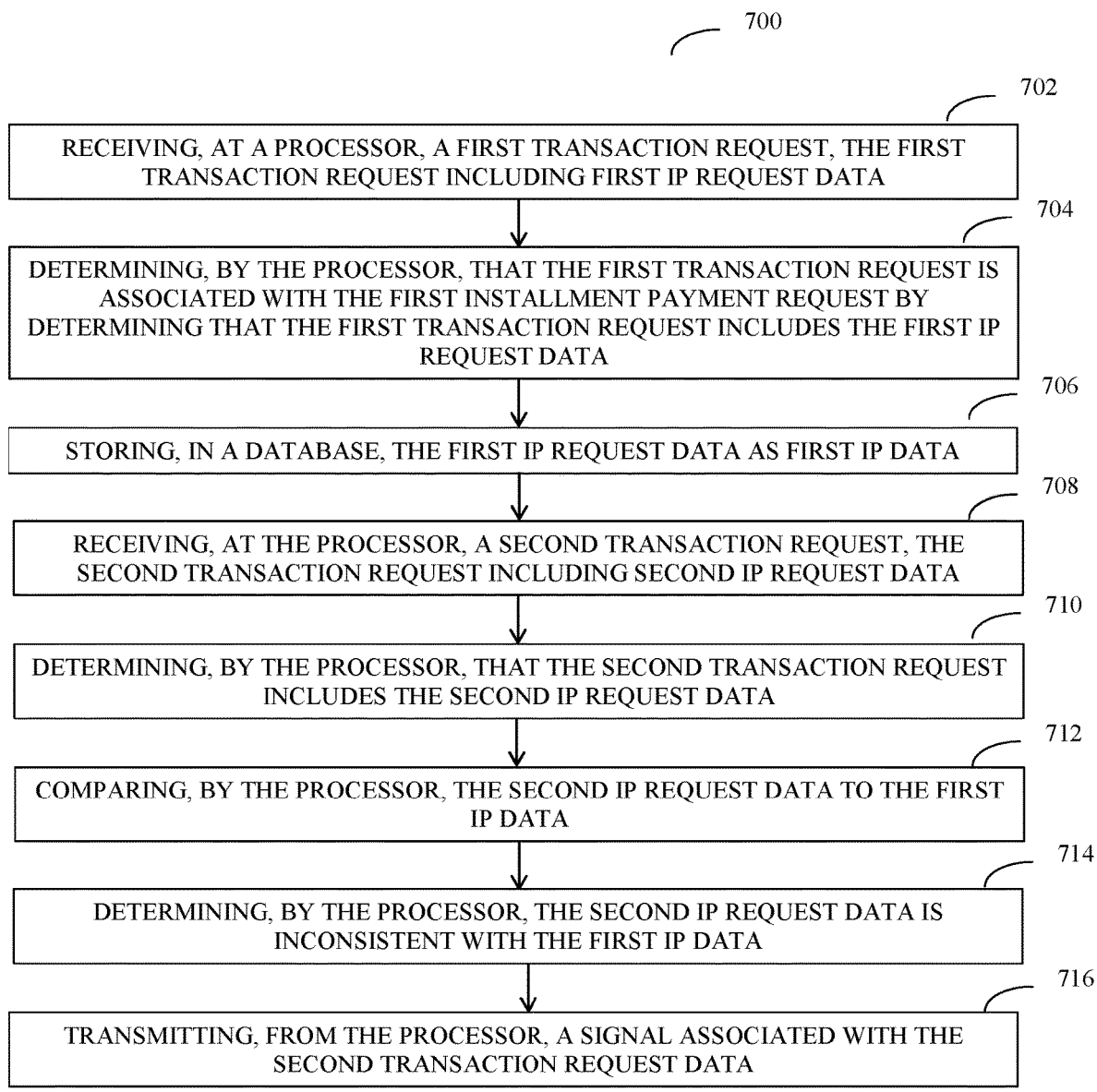

FIG. 7 is a flow chart of an example method 700 for monitoring installment payments and triggering events via the IP computing system shown in FIG. 1. Method 700 includes receiving 702, at a processor (e.g., processor 605), a first transaction request and determining 704, by the processor, that the first transaction request is associated with the first installment payment by determining that the first transaction request includes the first IP request data. Method 700 further includes storing 706, in a database, the first IP request data as first IP data 204, receiving 708, at the processor, a second transaction request, the second transaction request including second IP request data and an indication the second IP request data is associated with associated with the first IP request data, and determining 710, by the processor, that the second transaction request includes the second IP request data. Method 700 also includes comparing 712, by the processor, the second IP request data to the first IP data 204, determining 714, by the processor, the second IP request data is inconsistent with the first IP data 204, and transmitting 716, from the processor, a signal associated with the second transaction request data.

Method 700 may also include, before transmitting the signal associated with the second transaction request, determining, by the processor, a user preference. In some embodiments of method 700 the determined user preference is transmitting an alert to a user computing device and method 700 further includes receiving, at the processor, a signal from the user computing device to block the second transaction request.

In some embodiments of method 700 the determined user preference is transmitting a signal to an issuer computing device to block the second transaction request.

In some embodiments of method 700 the data the processor is configured to compare includes an amount charged for the first installment payment request with an amount requested for the second IP request, a length of time for installment payments with a date of the second IP request, and a frequency of installment payments with the date of the first IP request and the date of the second IP request.

In certain embodiments method 700 includes comparing, by the processor, IP request data to other associated IP request data stored in the memory device.

In some embodiments method 700 includes determining, by the processor, the second IP request data is associated with the first IP request data.

Figure 8:
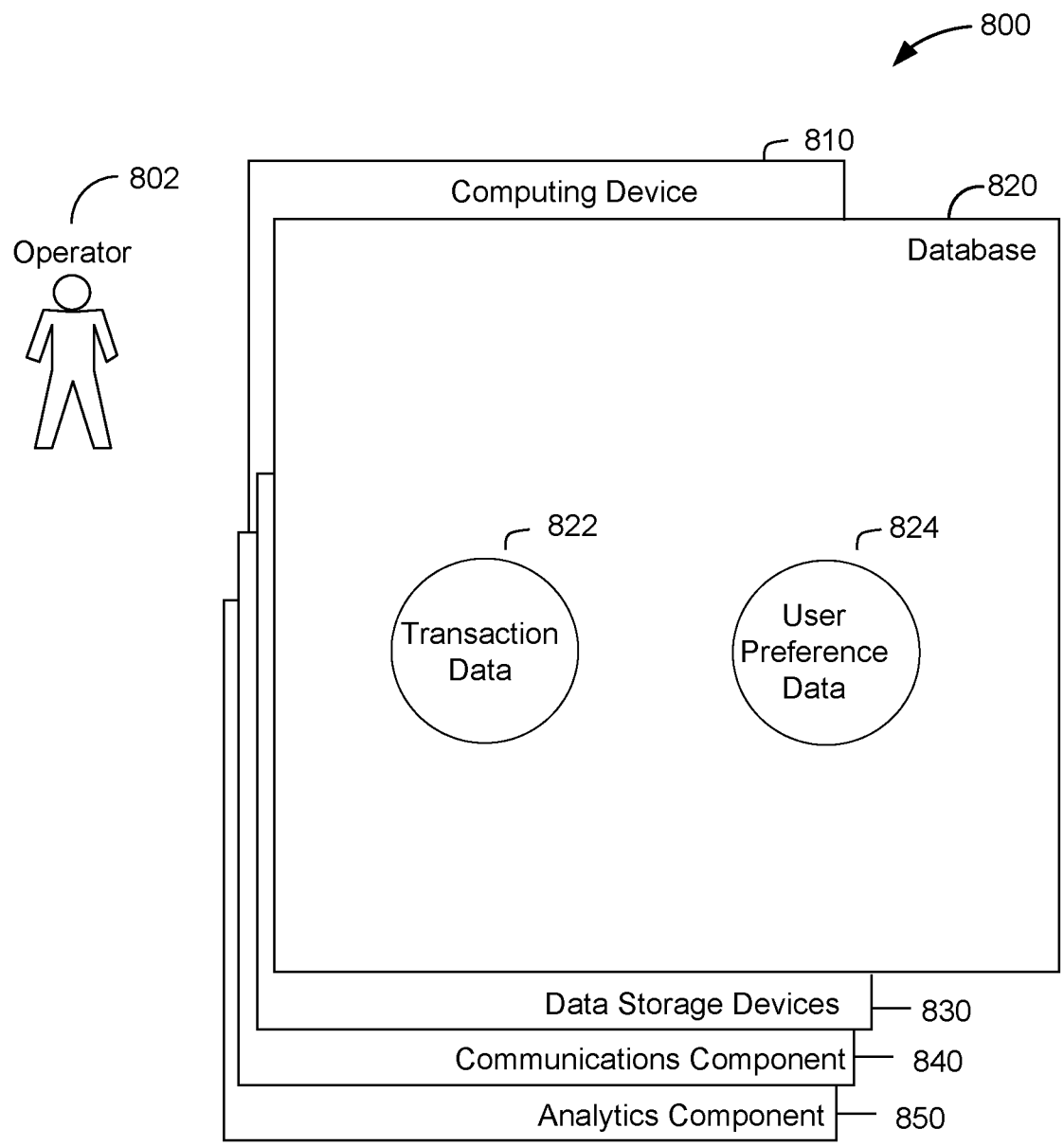

FIG. 8 is a diagram of components of one or more example computing devices that may be used in the IP computing system shown in FIG. 1. In some embodiments, computing device 810 is used to implement installment payment (IP) computing device 102 (shown in FIG. 1). The computer components may be used to monitor installment payments and transmit signals to other computing devices, such as user computing device 110 (shown in FIG. 1). Operator 802 (such as a user operating IP computing device 102) may access computing device 810 in order to service computing device 810. In some embodiments, database 820 is similar to IP database 112 and/or AC database 114 (both shown in FIG. 1). Database 820 may be coupled with several separate components within computing device 810, which perform specific tasks. In the example embodiment, database 820 includes transaction data 822 and user preference data 824.

Computing device 810 includes database 820, as well as storage devices 830, for storing data within database 820, such as storing transaction data 822 and user preference data 824. Computing device 810 further includes communications component 840 for receiving 702 (shown in FIG. 7) first transaction request data 202, receiving 708 second transaction request data 204, receiving, in some embodiments, from user computing device 110 a signal to block a transaction, and transmitting 716 a signal associated with the second transaction request data 206.

Computing device 810 further includes analytics component 850 for determining 704 (shown in FIG. 7) the first transaction request includes first installment payment data, determining 710 the second transaction request includes second installment payment data, comparing 712 second IP request data to first IP data, and determining 714 the second IP request data is inconsistent with the first IP data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of monitoring repeating data. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the transportation controller (TC) computing device are described herein as including general processing and memory devices, it should be understood that the IP computing device is a specialized computer configured to perform the steps described herein for monitoring repeating data, such as installment payments, and triggering events that may cause alerts to be transmitted and/or declines to be initiated.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A computing system for validating repeating data comprising at least one computing device including at least one processor communicatively coupled to a memory device, the at least one processor programmed to:
  receive, from a user computing device associated with a user account, a selection of a notification preference of a plurality of notification preferences presented at the user computing device;
  store, in the memory device, the notification preference as being associated with the user account
  receive a first instance of data associated with the user account, the first instance of data including first repeating data elements comprising:
    a length of time over which instances of repeating data will be received; and
    a frequency at which the instances of repeating data will be received;
  determine that the first instance of data is associated with a first repeating data plan by determining that the first instance of data includes the first repeating data elements;
  store, in the memory device, the first repeating data elements;
  receive a second instance of data associated with the user account, the second instance of data including second repeating data elements;
  determine that the second repeating data elements are associated with the first repeating data plan;
  compare the second repeating data elements to the first repeating data elements stored in the memory device;
  determine that the second repeating data elements are inconsistent with the first repeating data elements stored in the memory device;
  determine, based upon the notification preference stored in the memory device, to transmit a signal to the user computing device indicating the second repeating data elements are inconsistent with the first repeating data elements;
  transmit, to the user computing device associated with the first repeating data plan, the signal, wherein receipt of the signal causes the user computing device to display a selectable control associated with blocking a transaction associated with the second repeating data elements;

receive, from the user computing device, a signal generated in response to user selection of the selectable control at the user computing device; and cause the transaction to be blocked in response to receiving the signal generated and transmitted by the user computing device.

2. The computing system of claim 1, wherein the processor is further configured to, before transmitting the signal associated with the second repeating data elements, determine to transmit the signal by identifying the notification preference.

3. The computing system of claim 2, wherein the notification preference is an alert transmitted to a user computing device.

4. The computing system of claim 3, wherein the processor is further configured to transmit the signal in response to determining that the notification preference is the alert.

5. The computing system of claim 1, wherein the data the processor is configured to compare includes:

the length of time over which instances of repeating data will be received with a date of the second instance of data; and the frequency at which the instances of repeating data will be received with a date of the first instance of data and the date of the second instance of data.

6. The computing system of claim 1 wherein the processor is further configured to compare instances of repeating data to other associated instances of repeating data stored in the memory device.

7. The computing system of claim 1 wherein the first instance of data comprises a first installment payment request and the second instance of data comprises a second installment payment request, and the processor is further configured to, upon receipt of the second installment payment request, determine if a second installment payment has already been completed.

8. The computing system of claim 1, wherein the processor is further configured to determine that the second repeating data elements are inconsistent with the first repeating data elements by determining a difference between the first repeating data elements and the second repeating data elements exceeds a predefined threshold.

9. The computing system of claim 1, wherein at least one of the first instance of data or the second instance of data comprises an ISO 8583 network message.

10. A method for monitoring installment payments and triggering events based on installment payment (IP) data, the method comprising:

receiving, from a user computing device associated with a user account, a selection of a notification preference of a plurality of notification preferences presented at the user computing device;

storing, in a memory device, the notification preference as being associated with the user account receiving, at a processor, a first transaction request associated with the user account, the first transaction request including first IP request data including:

an amount requested for a first installment payment;

a length of time for installment payments, indicating a period of time over which the installment payments will be made; and a frequency of the installment payments, indicating the frequency at which the installment payments will be made over the length of time for the installment payments;

determining, by the processor, that the first transaction request is associated with the first installment payment by determining that the first transaction request includes the first IP request data;

storing, in the memory device, the first IP request data as first IP data;

receiving, at the processor, a second transaction request associated with the user account, the second transaction request including second IP request data and an indication the second IP request data is associated with the first IP request data;

determining, by the processor, that the second transaction request includes the second IP request data;

comparing, by the processor, the second IP request data to the first IP data stored in the memory device;

determining, by the processor, that the second IP request data is inconsistent with the first IP data stored in the memory device;

determining, based upon the notification preference stored in the memory device, to transmit a signal to the user computing device indicating the second IP request data is inconsistent with the first IP data;

transmitting, to the user computing device associated with the first IP request data, the signal, wherein receipt of the signal causes the user computing device to display a selectable control associated with blocking the second transaction request;

receiving, from the user computing device, a signal generated in response to user selection of the selectable control at the user computing device; and causing, by the processor, the second transaction request to be blocked in response to receiving the signal generated and transmitted by the user computing device.

11. The method of claim 10 further comprising, before transmitting the signal associated with the second transaction request, determining, by the processor, to transmit the signal by identifying the notification preference.

12. The method of claim 11, wherein the notification preference is transmitting an alert to the user computing device.

13. The method of claim 12 further comprising transmitting the signal in response to determining that the notification preference is the alert.

14. The method of claim 10, wherein the data the processor is configured to compare includes:

an amount charged for the first transaction request with an amount requested for the second IP request;

a length of time for the installment payments with a date of the second IP request; and a frequency of the installment payments with a date of the first IP request and the date of the second IP request.

15. The method of claim 10 further comprising comparing, by the processor, IP request data to other associated IP request data stored in the memory device.

16. The method of claim 10 further comprising determining, by the processor, that the second IP request data is associated with the first IP request data.

17. At least one non-transitory computer-readable storage media having computer-executable instructions embodied thereon wherein when executed by at least one installment payment (IP) computing device including at least one processor, the computer-executable instructions cause the IP computing device to:

receive, from a user computing device associated with a user account, a selection of a notification preference of a plurality of notification preferences presented at the user computing device;

store, in the at least one storage media, the notification preference as being associated with the user account;
receive a first transaction request associated with the user account, the first transaction request including first IP request data comprising:
  an amount requested for a first installment payment;
  a length of time for installment payments, indicating a period of time over which installment payments will be made; and
  a frequency of the installment payments, indicating the frequency at which installment payments will be made over the length of time for installment payments;
determine that the first transaction request is associated with the first installment payment by determining that the first transaction request includes the first IP request data;
store, in the at least one storage media, the first IP request data as first IP data;
receive a second transaction request associated with the user account, the second transaction request including second IP request data;
determine that the second transaction request includes the second IP request data;
compare the second IP request data to the first IP data stored in the at least one storage media;
determine that the second IP request data is inconsistent with the first IP data stored in the at least one storage media;
determine, based upon the notification preference stored in the at least one storage media, to transmit a signal to the user computing device indicating the second IP request data is inconsistent with the first IP data;
transmit, to the user computing device associated with the first IP data, the signal, wherein receipt of the signal causes the user computing device to display a selectable control associated with blocking the second transaction request;
receive, from the user computing device, a signal generated in response to user selection of the selectable control at the user computing device; and
cause the second transaction request to be declined in response to receiving the signal generated and transmitted by the user computing device.

18. The computer-readable storage media of claim 17, wherein the computer-executable instructions further cause the IP computing device to, before transmitting a signal associated with the second transaction request, determine to transmit the signal by identifying the notification preference.

19. The computer-readable storage media of claim 18, wherein the computer-executable instructions further cause the IP computing device to transmit the signal in response to determining that the notification preference is an alert.

20. The computer-readable storage media of claim 17 wherein the computer-executable instructions further cause the IP computing device to compare IP request data to other associated IP request data stored in the at least one storage media.

\* \* \* \* \*